| OPERATION | ARM 36 | ARM 37 | |
|---|---|---|---|
| STEP 5 DURING CUTTING. | STORAGE PISTON IN. ARM GRIP RELEASED, DEPOSITING TOOL IN STORAGE. | | HOUSING REMAINS ROTATED 180° AS IN FIG. 14 STEP 3 UNTIL NEXT CYCLE STARTS. |
| STEP 6 DURING CUTTING. | ARM RETRACTED FROM USED TOOL & STORAGE ROTATED FOR NEXT TOOL. | | |
| STEP 7 DURING CUTTING. | ARM & NEXT TOOL RAISED TO PARK AWAITING END OF CUTTING OPERATIONS. | | |

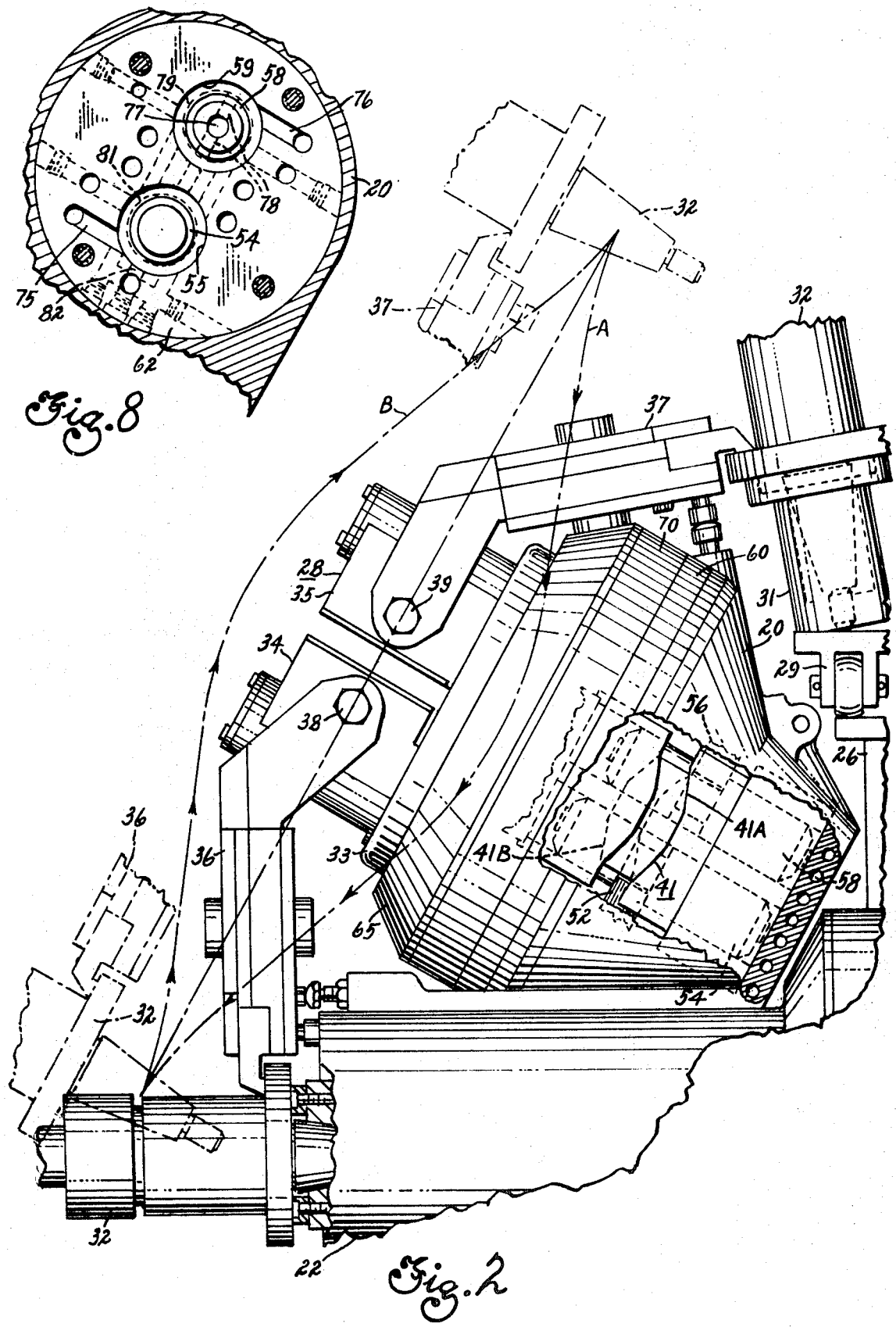

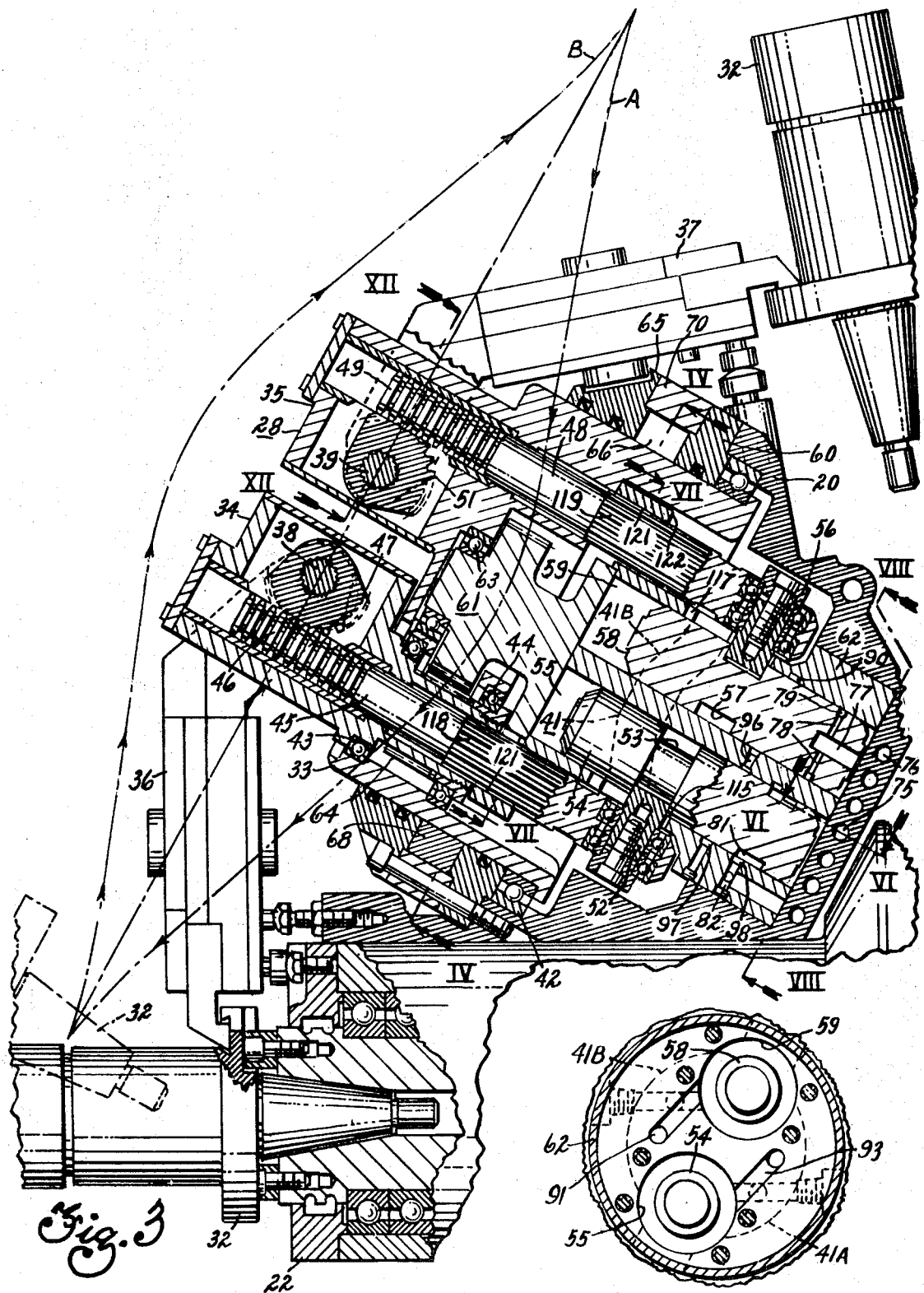

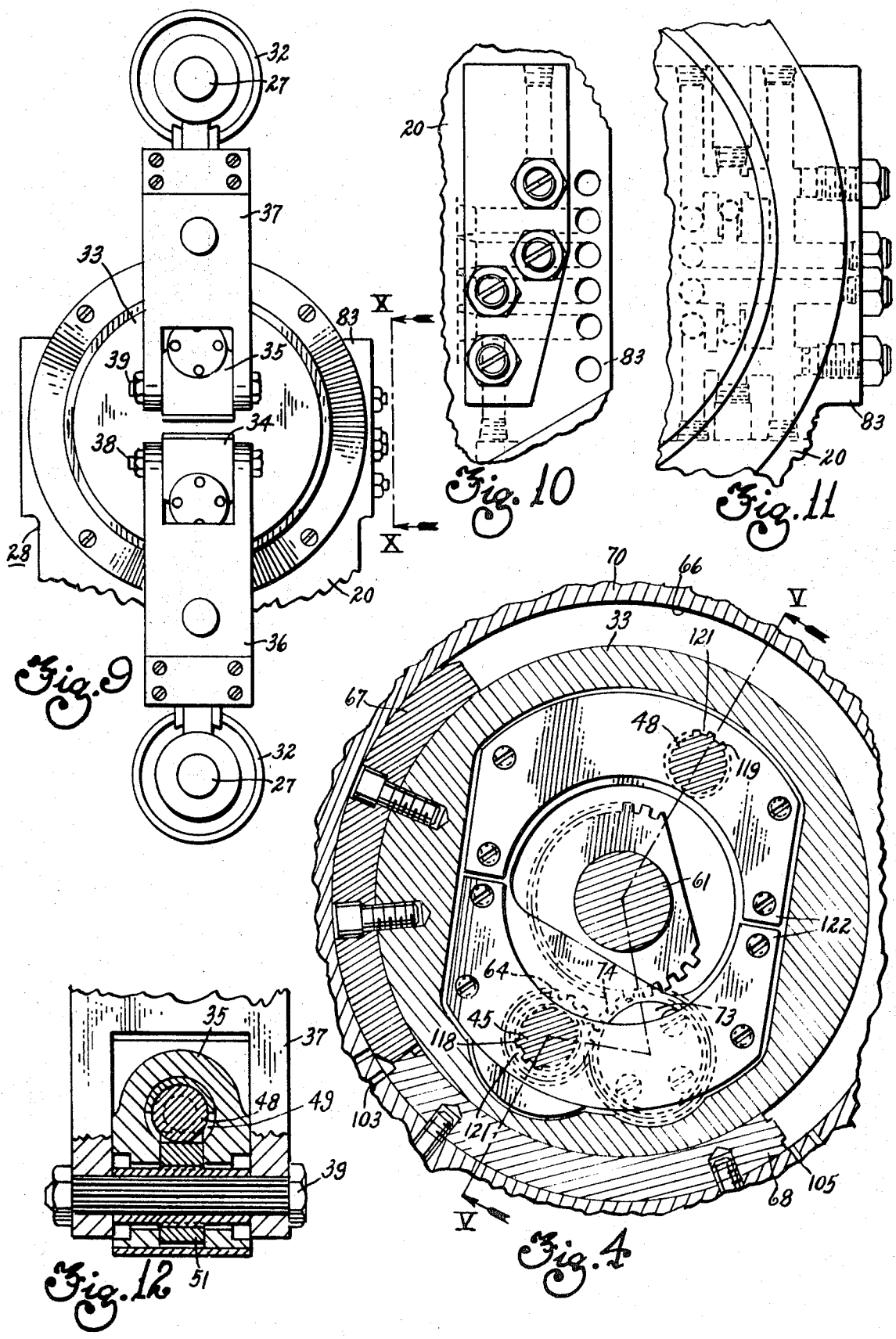

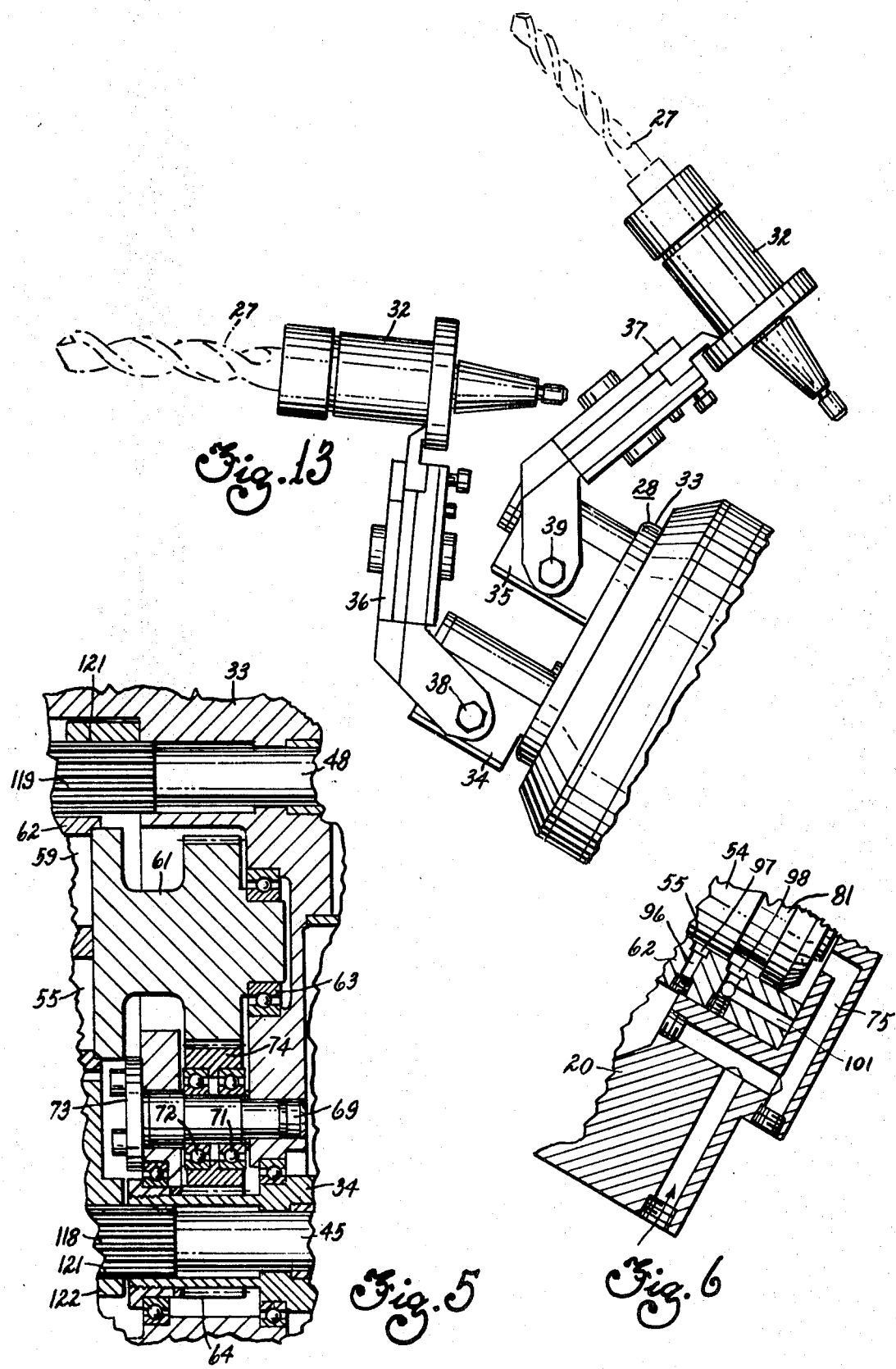

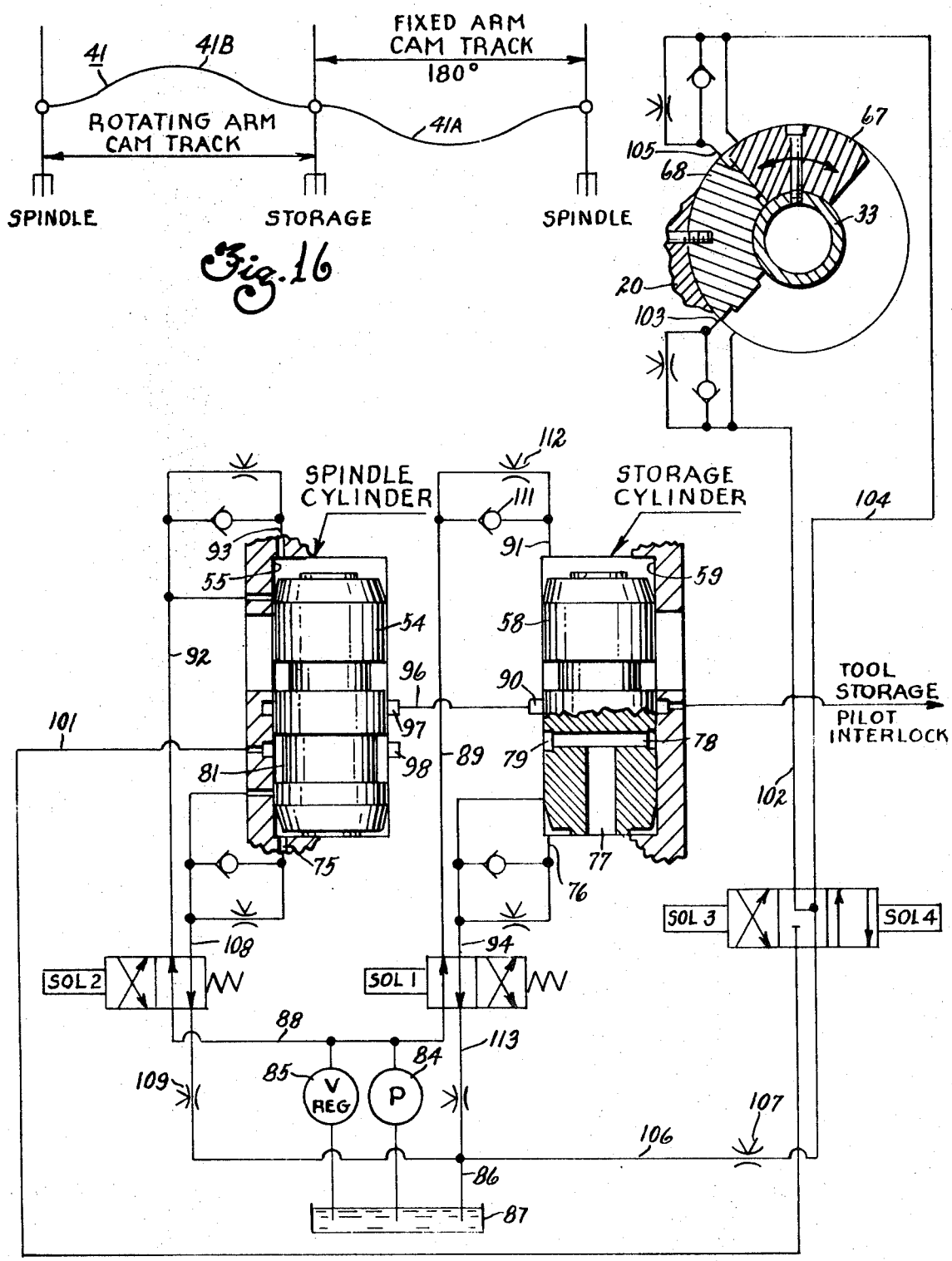

United States Patent Office 3,608,188
Patented Sept. 28, 1971

3,608,188
MACHINE TOOL
William B. Seidel, Cincinnati, Ohio, assignor to
Cincinnati Milacron Inc., Cincinnati, Ohio
Filed Jan. 22, 1969, Ser. No. 792,925
Int. Cl. B23q 3/157
U.S. Cl. 29—568                                              12 Claims

ABSTRACT OF THE DISCLOSURE

This invention has to do with a machine tool and, more particularly, a machine tool having a tool changing capability, wherein an interchanger is provided for transferring a tool from a tool rack to a work spindle and wherein the tool located in the tool rack for transfer is at a right angle to the axis of the spindle.

BACKGROUND OF THE INVENTION

It has been suggested in the past that there are certain advantages to providing a tool rack in which the tools are arranged in a generally horizontal, closed configuration with the tool axes generally perpendicular to the plane of the configuration and to providing an interchanger between a portion of that tool rack and a spindle whose axis is parallel but spaced from the plane of that configuration. Such a machine tool is shown in the patent of Seidel et al., Pat. No. 3,492,717. In the construction shown in that patent application, the arms which perform the interchange position are swung about an angled axis which lies between the axis of the tool in the tool rack and the axis of the spindle in a tool head. Swinging of these arms, however, in transferring a tool from the rack to the spindle and vice versa occupies a considerable volume of space and places certain design limitations on the machine tool. For instance, in that particular construction, the tool head must be mounted far enough out from the vertical machine columns so that the arms and the tools do not strike the column. Similar problems are presented by the presence of the workpiece in the machine. Such a large interchanger space requirement not only results in large cantilever forces on the elements, but also means that provision must be made for extremely large feed travel from the tool in interchange position to the tool in the machining position. These and other difficulties experienced with the prior art devices have been obviated in a novel manner by the present invention.

It is, therefore, an outstanding object of the invention to provide a machine tool having interchanger capabilities, wherein interchanger arms can produce the interchanging function without occupying a great detal of swing space.

Another object of this invention is the provision of a machine tool having a tool storage rack and an interchanger for moving tools from the rack to a work spindle, wherein the interchanger is provided with swinging arms which pass over and under one another during the interchanging cycle.

A further object of the present invention is the provision of a machine tool of the tool-changer, numerically-controlled type in which the interchanging function takes place within a relatively small space.

With these and other objects in view, as will be apparent to those skilled in the art, the invention resides in the combination of parts set forth in the specification and covered by the claims appended hereto.

SUMMARY OF THE INVENTION

In general, the present invention relates to a machine tool having a tool head with a rotatable spindle, having a storage rack for holding tools and presenting the tools one at a time to a position where the tool axis is at a right angle to the spindle axis, and having an interchanger including a main shaft which is rotatable about an axis lying at a substantial angle to the spindle axis and to the axis of a tool in the said position for interchanging a tool attached to the spindle with the tool in the said position. More specifically, the interchanger includes a main shaft which is rotatable about an axis lying at a substantial angle to the spindle axis and includes two arms, each of which is capable of hinged motion on a secondary shaft about an axis which is perpendicular to the shaft axis. The secondary shafts are parallel to one another and are spaced from the main shaft axis on opposite sides thereof.

Furthermore, means is provided to cause one arm to rotate independently about its secondary shaft as the main shaft also rotates and to cause the arms to rotate independently at that time about their hinge axis to cause one arm to pass under the other to prevent the arms and tools from striking other parts of the machine tool. During the interchanging cycle, one arm passes outwardly of the second arm relative to the main shaft, so that there is no danger of the arms and tools striking one another.

BRIEF DESCRIPTION OF THE DRAWINGS

The character of the invention, however, may be best understood by reference to one of its structural forms, as illustrated by the accompanying drawings, in which:

FIG. 2 is an enlarged side elevational view of an interchanger forming part of the invention, FIG. 3 is a side view of the interchanger with portions broken away, FIG. 4 is a transverse sectional view of the interchanger taken on the line IV—IV of FIG. 3, FIG. 5 is a sectional view of the invention taken on the line V—V of FIG. 4, FIG. 6 is a sectional view of the invention taken on the line VI—VI of FIG. 3, FIG. 7 is a sectional view of the invention taken on the line VII—VII of FIG. 3, FIG. 8 is a sectional view of the invention taken on the line VIII—VIII of FIG. 3, FIG. 9 is an end view of the interchanger, FIG. 10 is a side view of the interchanger taken on the line X—X of FIG. 9, FIG. 11 is a top view of the passage arrangement shown in FIG. 10, FIG. 12 is a sectional view of the invention taken on the line XII—XII of FIG. 3, FIG. 13 is a side view of the interchanger showing the parts in a different arrangement during the interchanging cycle, FIGS. 14 and 15 show a chart of the relationship of the parts during the interchanging cycle, FIG. 16 is a graph showing the relationship of some of the parts of the interchanger during the interchanging cycle, and FIG. 17 is a hydraulic diagram showing the supply of pressure oil to the various parts during the interchanging cycle.

DESCRIPTION OF THE PREFERRED EMBODIMENT

Figure 1:
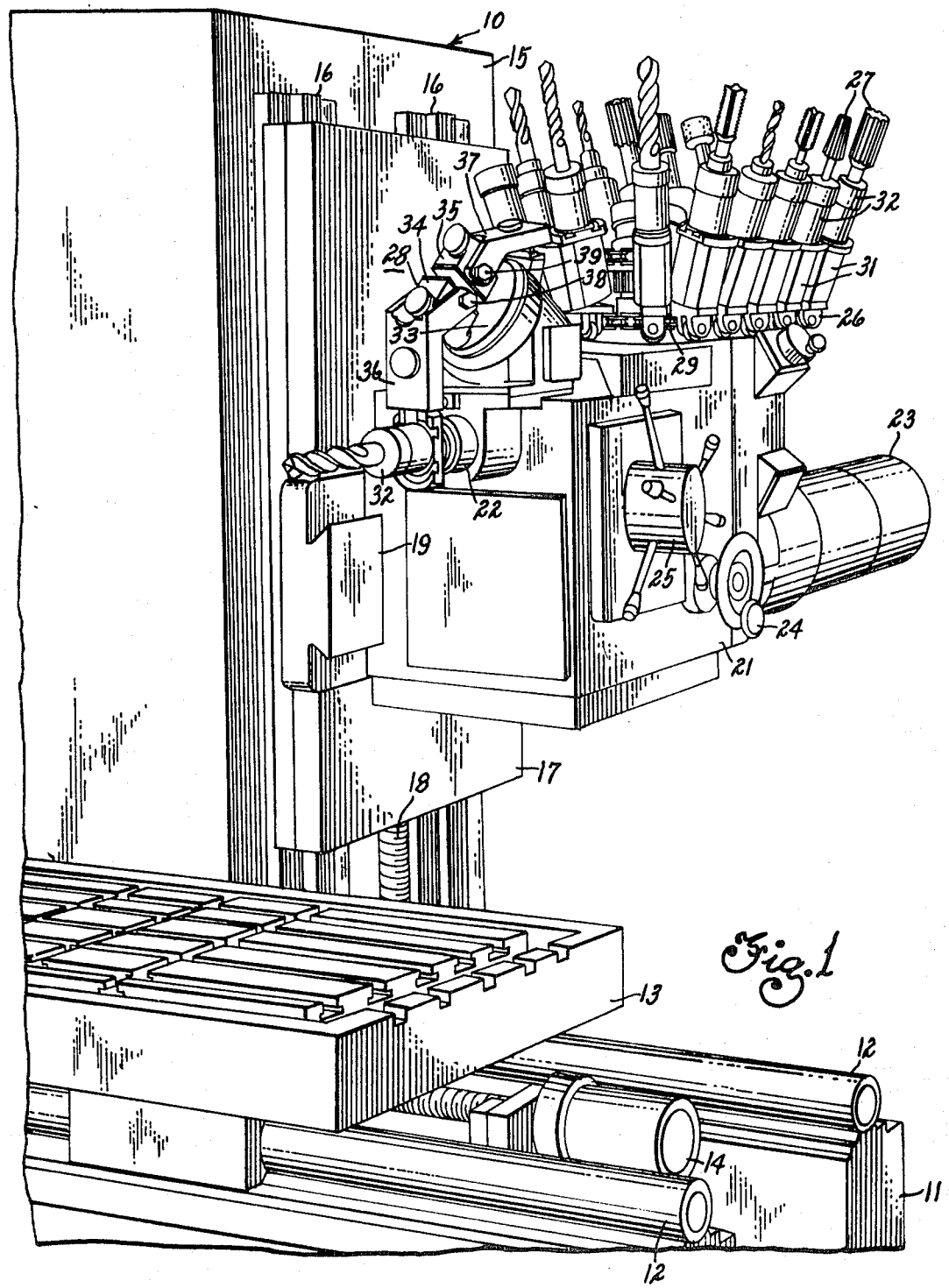
FIG. 1 is a perspective view of a machine tool embodying the principles of the present invention.

Referring first to FIG. 1, wherein are best shown the general features of the invention, the machine tool, indicated generally by the reference numeral 10, is shown as having a base 11 formed with parallel horizontal ways 12. On these ways are mounted a table 13 which is movable along the "X-axis" by a motor 14. Extending upwardly from the base is a column 15 having vertical ways 16. On these ways are mounted a table 17 movable along the "Y-axis" by a screw 18 driven by a motor (not shown).

The table 17 is provided with a set of horizontal ways 19 and mounted on these ways for sliding along the "Z-axis" is a spindle carrier 21. Rotatably mounted in this spindle carrier is a spindle 22 driven by a motor 23. Suitable handles 24 and 25 extend from the side of the spindle carrier for manual operation. Mounted on top of the spindle carrier is a tool storage rack 26 which carries a plurality of tools 27 with their axes extending generally upwardly. These tools lie in a generally horizontal plane configuration and at one end of the rack is located an interchanger 28 for transferring the tools from the rack 26 to the spindle 22.

As is evident in FIG. 1, the tool storage rack consists of an endless chain belt 29 on which are mounted a plurality of sockets 31. These sockets, in turn, are adapted to receive a standard tool holder 32, each tool holder carrying its tool.

The interchanger 28 consists of a main shaft 33 which is rotatable on an axis which is set at an angle between the axis of the spindle 22 and the generally vertical axis of the tools 27. Actually, the tools have a slight outward inclination (around 10°) from a vertical direction, but for the purposes of the specification and claims, they will ordinarily be described as being vertical. Extending from the outer end of the main shaft 33 on opposite sides of its axis are two secondary shafts 34 and 35 which carry hinged arms 36 and 37. These arms are hingedly attached to the secondary shafts 34 and 35 by means of hinge pins 38 and 39 whose axes are parallel to one another, are spaced, and lie on opposite sides of the axis of the main shaft 33.

The entire machine tool 10 is provided with numerical control apparatus of the well-known type which not only provides for movement of the table 13 along the X-axis and movement of the table 17 along the Y-axis as well as movement of the spindle carrier 21 along the Z-axis, but also provides for selection of speed of the spindle 22 and for interchange of tools from the tool storage rack 26 through the interchanger 28 to the spindle 22, in accordance with a selected sequence of machining operations.

In FIG. 2 it can be seen that the interchanger 28 provides for rotation of the main shaft 33 about a primary axis as well as simultaneous rotation of the secondary shafts 34 and 35 about secondary axis. The arms 36 and 37 are also rotated about their hinge pins 38 and 39 about tertiary axis. The ends of the arms 36 and 37 are provided with clamping means by which they clamp a flange on the tool holders 32 in the well-known manner. In this view, the path taken by the arm 37 and the tool which is passing from a park position to the spindle 22 passes along a lower path A, while the arm 36 carrying a used tool from the spindle 22 to the tool storage rack 26 passes through an upper path B, the hinging action of the arms about the hinge pins 38 and 39 being determined in part by cam surfaces 41. Arm 37 will always traverse path A and arm 36 will always traverse path B. It can be seen that the socket 31 which carries the tool holder and the tool is inclined silghtly away from the vertical.

FIG. 3 shows the details of the interior of the interchanger 28. The main shaft 33 is of generally tubular form and is mounted for rotation in bearings 42 and 63. The secondary shaft 34 is mounted within the main shaft in spaced ball bearings 43 and 44, while the secondary shaft 35 is fixed relative to the main shaft 33 and rotates with it. Slidably carried within the secondary shaft 34 is a slide 45 formed with annular rack teeth 46 which is engageable with a segmental pinion gear 47 keyed to the hinge pin 38 which, in turn, is keyed to the arm 36. Rack teeth 46 permit shaft 34 and pinion gear 47 to rotate 360° around the axis of slide 45. Reciprocating motion of the slide 45, therefore, causes swinging motion of the arm 36 relative to the secondary shaft 34. In a similar manner, the secondary shaft 35 is provided with a slide 48 formed with a rack 49 which engages and drives a pinion gear 51, thus rotating the hinge pin 39 and swinging the arm 37 relative to the secondary shaft 35. To prevent rotation about their axes, slides 45 and 48 have splines 118 and 119, respectively, engaging mating splines 121 provided in member 122. The slide 45 is reciprocated by the engagement of a cam roller stub shaft 52 in a groove 53 formed in a piston 54. This piston is mounted for reciprocating motion parallel to the axis of the main shaft 33 in a bore 55 formed in a housing which is fastened to the housing of the spindle carrier. In a similar manner, a similar rotatable cam roller stub shaft 56 extends transversely of the slide 48 at the inner end thereof and engages a groove 57 formed in a piston 58. The piston reciprocates in a bore 59 formed in the same portion of the housing as the bore 55. Suitable hydraulic connections are made, as will be described hereinafter, for the reciprocation of these pistons 54 and 58, on occasion. A gear 61 is fixedly mounted in the toolhead on the outer end of the element 62 which is formed with the bores 55 and 59, and a ball bearing 63 extends between a stub of the gear and the secondary shaft 35. Since the secondary shaft 35 forms a part of the main shaft 33, it can be seen that the main shaft is mounted in the bearing 42 on the outside and on the bearing 63 on the interior. The gear 61 indirectly drives a gear 64 formed on the outside of the secondary shaft 34, thus causing a rotation of the secondary shaft 34 relative to the main shaft 33 when the main shaft is rotated.

Referring now to FIG. 4, which is a transverse cross-section through the interchanger, it can be seen that the main shaft 33 is rotatable in central bores formed in rings 60 (FIG. 3) and 65 attached to the housing 20. The housing is also provided with an anular groove 66 formed by rings 60, 65, and 70 attached to the housing 20 and acting as one part of a hydraulic vane-type motor for rotating the main shaft. A vane 67 is bolted to the main shaft 33, while a block 68 is bolted to the ring 70. Both block and vane lie in the groove 66, so that the introduction of hydraulic fluid on either side of the vane 67 causes a 180° rotation of the main shaft 33 relative to the housing of the toolhead.

FIG. 5 shows the manner in which a stub shaft 69 is fixedly mounted in the main shaft 33 by bolts through its flanged portion 73. Its location relative to the other axes is best shown in FIG. 4. On the stub shaft is rotatably mounted on bearings 71 and 72 an idler gear 74 which engages the gear 61 on the one hand and, on the other hand, the gear 64 associated with the secondary shaft 34. These three gears 61, 74, and 64, by proper selection of their pitch circles, permit a selection of a suitable rotation of the secondary shaft 34 relative to the main shaft 33 during the rotation of the latter.

FIG. 6 is a section of the apparatus taken on the line VI—VI of FIG. 3 and shows the hydraulic connections at the base of the piston 54. Pressure fluid can be introduced through the passage 75 into the base of the bore 55 formed in the element 62. A similar passage 76 supplies oil to the base of the piston 58, as is evident in FIG. 8. FIG. 8 shows the pistons 54 and 58 as observed from the lower ends thereof. The lower end of the piston 58 is provided with an axial bore 77, at the inner end of which are provided laterally-extending passages 78 leading to an annular groove 79. The piston 54 is provided with an annular groove 81 located somewhat upwardly from its inner end. This groove overlaps a passage 82 formed in the element 62, on occasion.

FIG. 9 is an end view of the interchanger 28 and particularly, shows its housing 20 as provided with a protuberance 83 to which the hydraulic connections are made. In FIG. 10, which is a side view of this protuberance 83, as well as in FIG. 11, the various passages associated with that protuberance are clearly shown. These connections and passages are best described in connection with FIG. 17, which is the hydraulic schematic showing the connections between the various elements of the machine. First of all, in the hydraulic schematic of FIG. 17, we can see the piston 54 slidable in its bore 55, as well as the piston 58 slidable in its bore 59. Somewhat schematically shown is the vane 67 bolted to the main shaft 33 and the block 68 which is fixed relative to the housing 20 of the interchanger. Also forming part of the controls are solenoid valves SOL1, SOL2, SOL3, and SOL4, all receiving pressure oil from a pump 84 associated with a pressure regulating valve 85. A drain line 86 discharges into a sump 87. The pressure side of the pump 84 is connected by a line 88 to the valve SOL1, passes from there through a line 89 to the upper end of the bore 59 at the top of the piston 58 through a passage 91 (see FIG. 7). In a similar manner, the output line 88 of the pump 84 is connected through the solenoid valve SOL2 to a line 92 leading to the upper end of the bore 55 or the top end of the piston 54 through a passage 93 (see FIG. 7). The pressure line 88 of the pump 84 is also connected, on occasion, through the solenoid valve SOL1 to a line 94, which has access to the bottom of the bore 59 and the bottom side of the piston 58 through a passage 76. As has been described before, the pressure oil in the bottom of the piston 58 also gains access through the short bore 77, the transverse passages 78 to the groove 79. The wall of the bore 59 is also provided with a groove 90. This groove 90 extends entirely around the bore 59 and, at certain positions of the piston 58 within the bore 59, the groove 79 overlaps it or is co-extensive with it. This groove 90 is connected by a line 96 to a similar groove 97 formed in the wall of the bore 55 (see FIG. 6). A similar groove 98 is formed in the wall of the bore 55 a short distance from the groove 97 and the piston 54 is formed with a groove 81 which extends axially along the piston a sufficient distance to bridge the two grooves 97 and 98, on occasion. The groove 98 is connected by a line 101 to the valve SOL3 and SOL4 and, from there, through a line 102 to a passage 103 at one side of the stop 68. The solenoid also can be connected, on occasion, through a line 104 to a passage 105 at the other side of the block 68 (see FIG. 4). A line 106 also connects the solenoids SOL3 and SOL4 to drain through a variable restrictor 107, with the line 86 leading to drain. The bottom of the bore 55 under the piston 54 is exhausted through the passage 75 and a line 108 through the valve SOL2 and a variable restrictor 109 to the drain line 86. Each of the passages entering one of the hydraulic actuators is provided with a check valve and a restrictor. For instance, the passage 91 is provided with a check valve 111 and a variable restrictor 112. Pressure oil from the line 89 passes to the top of the piston 58 through the check valve 111 without difficulty but, when the solenoid valve SOL1 connects the passage 91 to "exhaust" through a line 113, the variable restrictor 112 restricts the flow. In the same way, the passage 76, the passage 75, the passage 93, the passage 103, and the passage 105 are each provided with a check valve to allow pressure fluid to enter and a variable restrictor to restrict the outward flow to drain.

FIG. 12 shows the details of the connection of the arm 37 to the secondary shaft 35 through the hinge pin 39. Engagement of the pinion gear 51 with the rack 49 on the slide 48 is clearly shown.

Figure 14:
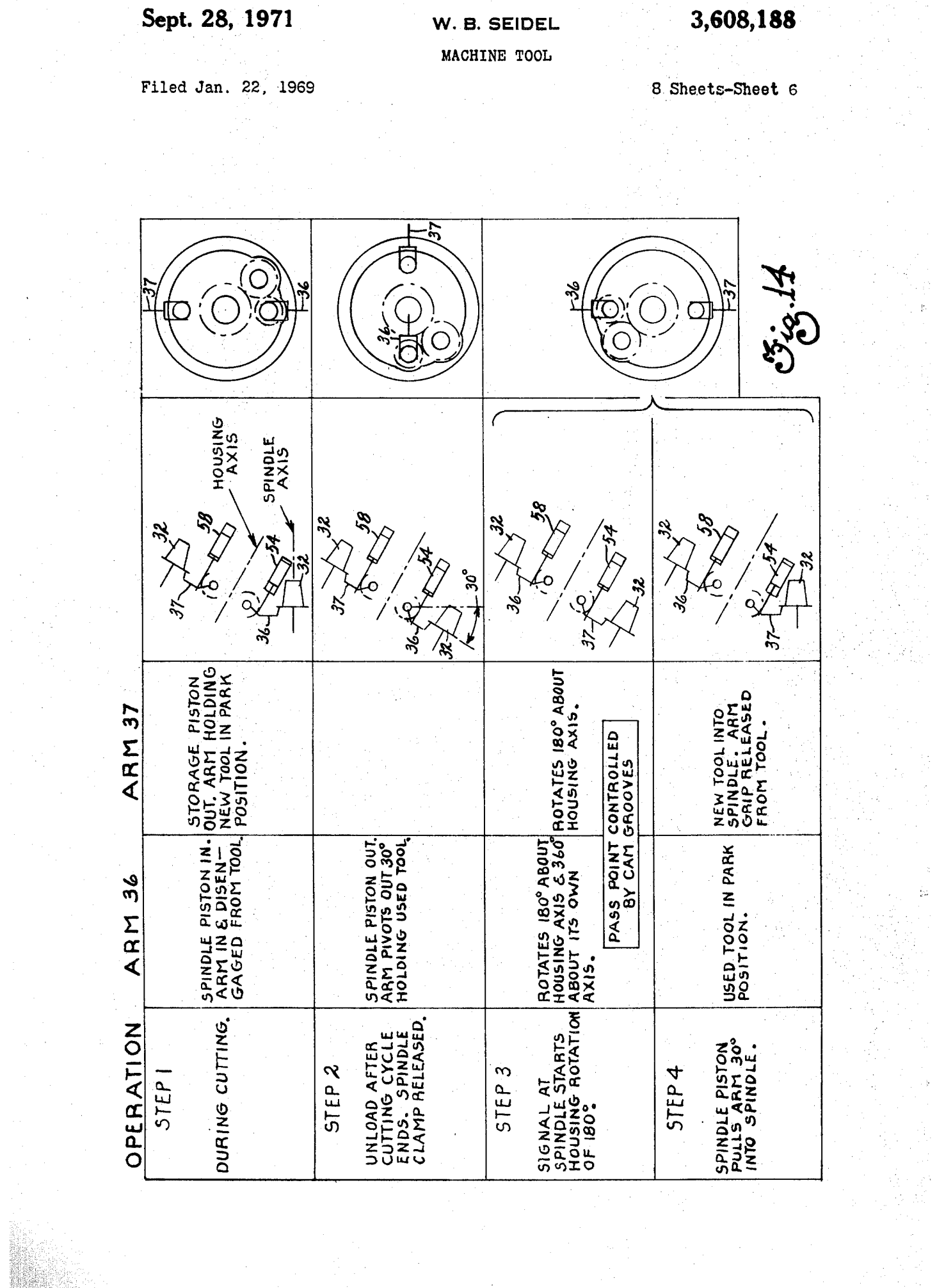

The operation of the apparatus will be best understood by an examination of FIGS. 14 and 15, which show in chart form the various conditions of the parts as an interchange cycle takes place. In Step 1, while the machine cycle is going on and a tool 27 is occupied in machining a workpiece, the arm 36 lies adjacent the tool holder 32 which is engaged with the spindle 22. The clamping mechanism is loose, however, so that the tool holder is able to rotate with the spindle. The arm 37 has withdrawn the new tool holder 32 with the next tool to be used and holds it in a "PARK" position. After the machining operation is over, the interchange cycle begins. In Step 2, the clamp that is provided in the spindle 22 to hold the tool holder tightly is released, so that the tool holder is free to be clamped by the arm 36. The arm 36 pivots outwardly about 30° holding the used tool, while the arm 37 remains in "PARK" position. After this has been accomplished, as is evident in the drawing, the arms are both extending outwardly at a right angle to the axis of the main shaft 33. In Step 3, the main shaft 33 begins to rotate and then rotates 180° in a clockwise direction. At the same time, the arm 36 rotates counter-clockwise 180° relative to the main shaft, which means that it rotates 360° about its own axis, and it extends diametrically across the main shaft axis in the manner shown in FIG. 13. The arm 37 rotates right along with the main shaft and, therefore, rotates 180° about the housing axis, but does not rotate relative to the main shaft 33. The arms end up in the position shown in Step 3 with the arm 36 in the upper position next to the tool rack and the arm 37 adjacent the spindle 22. In the process of reaching these positions, however, the arm 36 has been rotated about its hinge pin 38 clockwise, so it takes the path B (see FIG. 2), while the arm 37 has been rotated clockwise, so that it takes the lower path A. The arms and tools, therefore, do not conflict with one another. The passage, in this way, is controlled by the cam track 41 having lower track 41A and upper track 41B. In Step 4, the passage of oil to the top of the piston 54 causes the arm 37 to move inwardly to thrust the tool holder 32 into the socket in the spindle 22. The arm 36, which carries the used tool, remains in "PARK" position and, of course, the arm 37 is released from the tool holder as soon as possible to allow it to rotate with the spindle 22. The apparatus (not shown) for clamping the tool holder 32 and the spindle 22 is actuated to lock them together and the machining operation starts. During the cutting (Step 5), oil is eventually admitted to the top of the piston 58, thus drawing the arm 36 inwardly to deposit the tool holder and tool in the empty socket in the tool rack and the grip on the arm 36 is released from the tool holder. Step 6 involves retracting the arm 36 from the storage rack. The storage rack is then operated to bring the next tool into the interchange position. In Step 7, the arm 36 moves in again to pick up the new tool and then moves out again 30° into "PARK" position to wait the end of the cutting operation. The housing remains in this 180° position until the next cycle starts, at which time a reverse rotation of the main shaft 33 takes place 180°. However, the rotation of the arms is the same, so that the arm 37, which now carries the old tool, moves under the arm 36, which now carries the new tool.

FIG. 16 shows the manner in which the cam surfaces operate on the rotating arm 36 and the fixed arm 37 to cause the arms to move through the separated paths indicated in FIG. 2. In these paths, the tool holders and tools are kept an adequate distance away from one another, so that they do not strike during the passage of the arms. At the same time, only one arm extends outwardly from the limited radius of turn of the main shaft, and this is the fixed arm 37. The other arm folds itself over within the confines of the extension of the hollow main shaft and, therefore, it does not swing in the direction of the column 15 of the machine tool. This makes it possible to place the axis of the spindle 22 very close to the supporting table 17 on the column 15. It makes for a much stronger machine to have these elements as close to the column as possible and not extending outwardly in a cantilevered fashion, i.e., far enough out from the mounting surfaces to permit complete swinging of the interchanger arms with the tools and tool holders in place. The explanation of the manner in which the cams operate to move the arms along the paths A and B can be best understood in connection with FIG. 3. Cam track 41 is formed on the periphery of stationary support member 62 and is engaged on its upper track 41B by cam roller stub shaft 52 extending from slide 45. Similar cam roller stub shaft 56 extends from slide 48 and engages lower cam track 41A whose edges curve in a direction opposite to those of surface 41B, as indicated in FIG. 16.

During the 180° turning of main shaft 33, shown in Step 3, of FIG. 14, cam surfaces 41A and 41B engage cam roller stub shafts 52 and 56 attached to slides 45 and 48, respectively, and produce the reciprocatory motion of slides 45 and 48 and, therefore, rotation of arms 36 and 37. This causes the tools to follow the path A and B as shown in FIGS. 2 and 3. When the 180° index is completed, cam roller stub shafts 52 and 56 are not engaged by cam surfaces 41A and 41B. Cam roller 52 extends through vertical slot 115 and engages a groove 53 formed on piston 54 and cam roller 56 extends through vertical slot 117 to engage a groove 57 formed on piston 58. Fluid pressure introduced to the tops of pistons 54 and 58 causes the arms 36 and 37 to make the 30° motion necessary to bring them into contact with spindle 22 or with tool storage rack 26. Exhausting the tops of pistons 54 and 58 and introducing fluid pressure at their bottoms extracts the tool from spindle 22 or from tool storage rack 26.

Pistons 54 and 58 do not rotate during indexing of main shaft 33 and secondary shafts 34, 35, and are alternately engaged by cam roller stub shafts 52 and 56, so that piston 54 always operates whichever of the arms 36 or 37 is at the spindle position at that particular time, and piston 58 always operates whichever of the arms 36 or 37 is at tool storage rack 26 at that particular time.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   (a) a spindle carrier having a rotatable spindle,
   (b) a storage rack for holding tools and presenting the tools one at a time to a position where the tool axis is at a right angle to the spindle axis,
   (c) an interchanger including a main shaft which is rotatable about a primary axis lying at a substantial angle to the spindle axis and to the axis of a tool in the said position and including two arms each of which is mounted on its respective secondary shaft for motion about secondary axes which are parallel to and spaced from the said primary axis, each of the arms being also mounted on its respective tertiary shaft for motion about tertiary axes which are perpendicular to the primary and secondary axes.

2. A machine tool as recited in claim 1, wherein means is provided to cause one of the arms to rotate independently about its tertiary shaft as the main shaft also rotates and to cause the arms to rotate independently at that time about their hinge axes to cause one arm to pass under the other to prevent the arms and tools from striking other parts of the machine tool.

3. A machine tool as recited in claim 2, wherein each tertiary shaft is formed with a rack and each arm is locked to a hinge pin which is provided with a pinion gear engaged by the rack.

4. A machine tool as recited in claim 3, wherein the main shaft carries an actuating piston for each tertiary shaft and a stub shaft on each tertiary shaft extends into a groove formed in its piston.

5. A machine tool as recited in claim 3, wherein hydraulic control means is provided to rotate the main shaft 180° during the interchanging cycle, and at the same time rotating one of said tertiary shafts relative to the main shaft and the other tertiary shaft while moving both secondary shafts axially.

6. A machine tool as recited in claim 5, wherein in an interchanging cycle the first arm which is removing a tool from the spindle rotates 180° in one direction with the main shaft and 360° in the other direction with its tertiary shaft, while the second arm which is placing a tool in the spindle rotates 180° in the said one direction with the main shaft.

7. A machine tool as recited in claim 6, wherein during the interchanging cycle the first arm passes outwardly of the second arm relative to the main shaft, so that there is no danger of the arms and tools striking one another.

8. A machine tool as recited in claim 6, wherein the first arm upon completion of its rotary movements is capable of being temporarily held against hinged motion thereby holding the tool in a "PARK" location while the storage rack is being brought to the said position for receiving the tool.

9. A machine tool as recited in claim 8, wherein during a sequence of repetitive similar operations involving two tools, one of said tools is held in the "PARK" position, while the other of said tools is performing its machining function.

10. A machine tool as recited in claim 6, wherein the second arm upon completion of its initial hinged motion is capable of being temporarily held against rotary movement thereby holding the tool in a "PARK" location.

11. A machine tool as recited in claim 10, wherein as the tool is held in the "PARK" location the storage rack is brought to the said position for later receiving the tool from the first arm.

12. A machine tool as recited in claim 1, wherein the main shaft is rotated 180° and at least one of the tertiary shafts is at the same time rotated 360° to reverse the arm positions from a "PARK" position adjacent the spindle to a "PARK" position adjacent the rack and vice versa, wherein means is provided for rotating the arms at the same time in opposite directions about their hinge axes to permit the arms and tools to pass one another without interference in moving from one "PARK" position to the other, and wherein means is provided to swing the arms about their hinge axes in the same direction from the "PARK" positions to spindle and rack engagement, respectively.

References Cited

UNITED STATES PATENTS 3,492,717   2/1970   Seidel et al. _____ 29—568

ANDREW R. JUHASZ, Primary Examiner

Z. R. BILINSKY, Assistant Examiner